US012577417B2

(12) United States Patent
Tominaga et al.

(10) Patent No.: US 12,577,417 B2
(45) Date of Patent: Mar. 17, 2026

(54) ACTIVE ENERGY RAY-CURABLE AQUEOUS INK, RECORDING METHOD AND RECORDING APPARATUS

(71) Applicant: CANON KABUSHIKI KAISHA, Tokyo (JP)

(72) Inventors: Yasuaki Tominaga, Kanagawa (JP); Kenji Shinjo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 17/749,425

(22) Filed: May 20, 2022

(65) Prior Publication Data

US 2022/0402291 A1 Dec. 22, 2022

(30) Foreign Application Priority Data

May 25, 2021 (JP) ................................. 2021-087769
May 18, 2022 (JP) ................................. 2022-081503

(51) Int. Cl.
*C09D 11/101* (2014.01)
*B41M 7/00* (2006.01)
(Continued)

(52) U.S. Cl.
CPC ......... *C09D 11/101* (2013.01); *B41M 7/0081* (2013.01); *C09D 4/00* (2013.01); *C09D 11/322* (2013.01)

(58) Field of Classification Search
CPC ............. B41M 7/0081; B41J 11/00214; C09D 11/101; C08F 220/603
See application file for complete search history.

(56) References Cited

U.S. PATENT DOCUMENTS 4,313,124 A 1/1982 Hara
4,345,262 A 8/1982 Shirato et al.
(Continued)

FOREIGN PATENT DOCUMENTS

CN 102167934 A 8/2011
CN 109952329 A 6/2019
(Continued)

OTHER PUBLICATIONS

First Office Action in Chinese Application No. 202210577934.6 (Nov. 2023).

(Continued)

*Primary Examiner* — Sophie Hon
(74) *Attorney, Agent, or Firm* — Venable LLP

(57) ABSTRACT

Provided is an active energy ray-curable aqueous ink which contains water and a curable substance and curable by an active energy ray. The curable substance contains a bifunctional polymerizable monomer represented by the following General Formula (1):

(1)

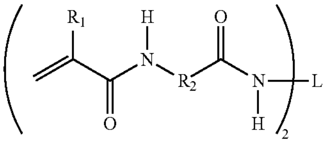

wherein, $R_1$ is a hydrogen atom or a methyl group, $R_2$ is a divalent saturated hydrocarbon group having 1 to 5 carbon atoms and L is a divalent saturated hydrocarbon (Continued)

group which may contain an ether bond, an amide bond, a carbonyl bond, a sulfone bond or a sulfonamide bond.

9 Claims, 1 Drawing Sheet

(51) Int. Cl.

| | |
|---|---|
| ***C09D 4/00*** | (2006.01) |
| ***C09D 11/322*** | (2014.01) |

(56) References Cited

U.S. PATENT DOCUMENTS

| | | | | |
|---|---|---|---|---|
| 4,459,600 | A | 7/1984 | Sato et al. | |
| 4,463,359 | A | 7/1984 | Ayata et al. | |
| 4,558,333 | A | 12/1985 | Sugitani et al. | |
| 4,723,129 | A | 2/1988 | Endo et al. | |
| 4,740,796 | A | 4/1988 | Endo et al. | |
| 4,871,824 | A * | 10/1989 | Heilmann | C12N 11/087 526/260 |
| 6,076,919 | A | 6/2000 | Shirota et al. | |
| 6,354,698 | B1 | 3/2002 | Tachihara et al. | |
| 6,612,688 | B2 | 9/2003 | Tachihara et al. | |
| 8,529,047 | B2 | 9/2013 | Yasuda et al. | |
| 8,690,306 | B2 | 4/2014 | Amao et al. | |
| 8,974,025 | B2 | 3/2015 | Kitada et al. | |
| 9,139,747 | B2 | 9/2015 | Kamada | |
| 11,036,135 | B2 | 6/2021 | Hara et al. | |
| 2008/0138580 | A1 * | 6/2008 | Low | B29C 41/20 264/319 |
| 2012/0249700 | A1 | 10/2012 | Amao et al. | |
| 2013/0070036 | A1 | 3/2013 | Ooishi | |
| 2022/0396087 | A1 * | 12/2022 | Shinjo | C09D 11/101 |

FOREIGN PATENT DOCUMENTS

| | | | | |
|---|---|---|---|---|
| CN | 115386264 | B * | 11/2024 | C09D 11/322 |
| EP | 2 363 437 | A2 | 9/2011 | |
| EP | 4095206 | B1 * | 5/2024 | C09D 11/30 |
| JP | 59-123670 | A | 7/1984 | |
| JP | 11-500152 | A | 1/1999 | |
| JP | 11-188870 | A | 7/1999 | |
| JP | 2962880 | B2 | 10/1999 | |
| JP | 3246949 | B2 | 1/2002 | |
| JP | 2007-099802 | A | 4/2007 | |
| JP | 2012-46568 | A | 3/2012 | |
| JP | 2012-214561 | A | 11/2012 | |
| JP | 2013-064074 | A | 4/2013 | |
| JP | 2013-199110 | A | 10/2013 | |
| JP | 2015-3396 | A | 1/2015 | |
| JP | 2017-160380 | A | 9/2017 | |
| WO | 96/24644 | A1 | 8/1996 | |

OTHER PUBLICATIONS

JP 2962880, Paragraph(s) [0057].
JP 3246949, Paragraph(s) [0057].
JP 11-188870, Paragraph(s) [0057].
JP 59-123670, Paragraph(s) [0057].
JP 2007-099802, Paragraph(s) [0014].
JP 2017-160380, Paragraph(s) [0014].
JP 2012-214561, Paragraph(s) [0004], [0013].
JP 3246949, U.S. Pat. No. 6,076,919.
JP 11-188870, U.S. Pat. No. 6,354,698 B1, U.S. Pat. No. 6,612,688 B2.
JP 2012-214561, U.S. Pat. No. 8,690,306 B2.
Shinjo et al., U.S. Appl. No. 17/748,255, filed May 19, 2022.
Extended European Search Report in European Application No. 22174812.2 (Oct. 2022).
Notice of Reasons for Refusal in Japanese Application No. 2022-081503 (Dec. 2025).

* cited by examiner

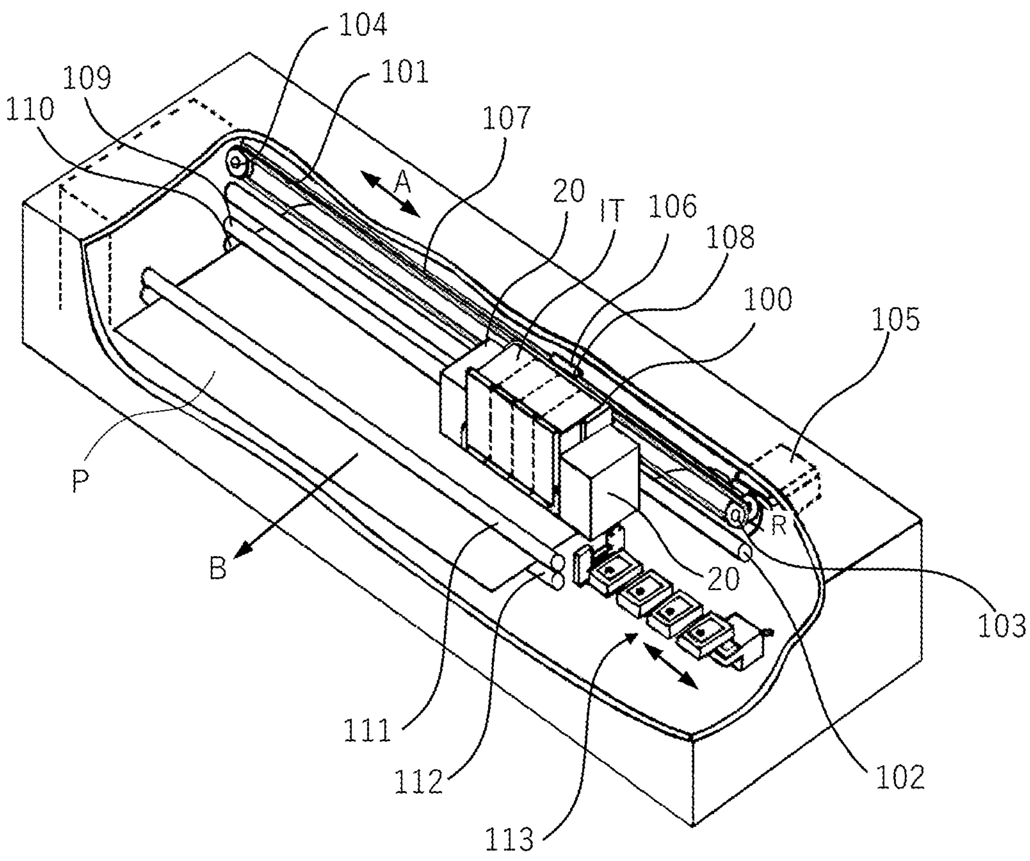
104
109
101
110
107
A
20
IT
106
108
100
105
P
R
B
20
103
111
112
102
113

ACTIVE ENERGY RAY-CURABLE AQUEOUS INK, RECORDING METHOD AND RECORDING APPARATUS

BACKGROUND OF THE INVENTION

Field of the Invention

The present disclosure relates to an active energy ray-curable aqueous ink containing a water soluble monomer. The present disclosure also relates to a recording method and a recording apparatus, each using the active energy ray-curable aqueous ink.

Description of the Related Art

In an ink jet system image forming method, a technology using an active energy ray-curable liquid composition as an ink is conventionally known. When the active energy ray-curable liquid composition is used as an ink, it is known to use a non-aqueous curable substance or an aqueous curable substance.

Examples of an ink using a non-aqueous curable substance, Japanese Patent Application Laid-Open No. 2017-160380 proposes a method of using an acrylic ester compound having an amide structure on the ester side thereof and thereby suppressing the odor of an ink.

Examples of an ink using an aqueous curable substance include a curable aqueous ink containing water, a monomer/oligomer and a pigment dispersion. The monomer and oligomer to be used in the curable aqueous ink is required to have good water solubility and stability in an aqueous solution. Japanese Patent Application Laid-Open No. 2012-214561 proposes a method of using an acrylamide compound having a specific structure and thereby providing an ink composition having good water solubility.

SUMMARY OF THE INVENTION

An object of the present disclosure is to provide an active energy ray-curable aqueous ink containing a monomer excellent in water solubility and, when cured, having excellent water resistance. The other object of the present disclosure is to provide a recording method and a recording apparatus, each using the active energy ray-curable aqueous ink.

According to one aspect of the present disclosure, there is provided an active energy ray-curable aqueous ink containing water and a curable substance and curable by an active energy ray, wherein the curable substance contains a bifunctional polymerizable monomer represented by the following General Formula (1):

(1)

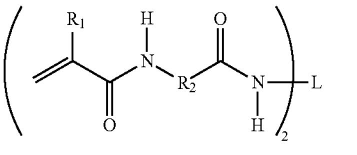

In General Formula (1), $R_1$ is a hydrogen atom or a methyl group, $R_2$ is a divalent saturated hydrocarbon group having 1 to 5 carbon atoms and L is a divalent saturated hydrocarbon group which may contain an ether bond, an amide bond, a carbonyl bond, a sulfone bond or a sulfonamide bond.

According to another aspect of the present disclosure, there is provided a recording method including at least a step of applying the active energy ray-curable aqueous ink onto a recording medium and a step of irradiating the active energy ray-curable aqueous ink applied onto the recording medium with an active energy ray.

According to a further aspect of the present disclosure, there is provided a recording apparatus including at least an ink application device for applying the active energy ray-curable aqueous ink to a recording medium and an active energy ray irradiation device for irradiating the active energy ray-curable aqueous ink applied onto the recording medium with an active energy ray.

Further features of the present disclosure will become apparent from the following description of exemplary embodiments with reference to the attached drawing.

BRIEF DESCRIPTION OF THE DRAWINGS

FIGURE is a schematic perspective view showing the structure of an ink jet recording apparatus according to one embodiment of the present disclosure.

DESCRIPTION OF THE EMBODIMENTS

The acrylic ester compound described in Japanese Patent Application Laid-Open No. 2017-160380 contains a monofunctional monomer having an amide bond in the ester structure and therefore has a reduced odor. This acrylic ester compound is however used for a non-aqueous ink. When this acrylic ester compound is incorporated in an aqueous ink, the resulting ink may have a problem in stability because of the hydrolysis of an acrylic ester bond as described in Japanese Patent Application Laid-Open No. 2007-099802.

The compound described in Japanese Patent Application Laid-Open No. 2012-214561 and having an acrylamide structure has good water solubility. The monomer in this compound however has high water solubility so that a cured product has a problem in water resistance.

The present inventors therefore have made keen researches on an active energy ray-curable aqueous ink containing a monomer excellent in water solubility and, when cured, having excellent water resistance; and a recording method and a recording apparatus each using the active energy ray-curable aqueous ink, and have completed the present disclosure.

The present disclosure will hereinafter be described in detail by preferable embodiments in reference to a drawing.

<Aqueous Ink>

(Curable Substance)

The active energy ray-curable aqueous ink according to the present disclosure contains water and a curable substance. The curable substance contains a bifunctional polymerizable monomer represented by the following General Formula (1). This active energy ray-curable aqueous ink is curable by an active energy ray. The "active energy ray-curable aqueous ink" will hereinafter be called "aqueous ink" simply.

(1)

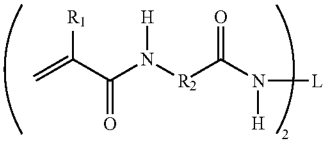

In General Formula (1), $R_1$ is a hydrogen atom or a methyl group, $R_2$ is a divalent saturated hydrocarbon group having 1 to 5 carbon atoms and L is a divalent saturated hydrocarbon group which may contain an ether bond, an amide bond, a carbonyl bond, a sulfone bond or a sulfonamide bond.

From the standpoint of the storage stability of the aqueous ink containing a monomer and the curing properties of the aqueous ink, a polymerizable monomer of General Formula (1) having a hydrogen atom as $R_1$ and an acrylamide group as a functional group is particularly preferred.

In General Formula (1), $R_2$ is not limited as long as it is a divalent saturated hydrocarbon group having 1 to 5 carbon atoms. To satisfy both the water solubility of the monomer and the water resistance of a cured product, $R_2$ is particularly preferably a divalent saturated hydrocarbon group having 2 to 4 carbon atoms. Specific examples include ethylene, propylene, isopropylene, butylene and isobutylene groups.

In General Formula (1), L is not limited as long as it is a divalent saturated hydrocarbon group which may contain an ether bond (—O—), an amide bond (—C(═O)—NH—), a carbonyl bond (—C(═O)—), a sulfone bond ($—SO_2—$) or a sulfonamide bond ($—SO_2—NH—$). Here, a divalent saturated hydrocarbon group, which may include an ether bond, an amide bond, a carbonyl bond, a sulfone bond, or a sulfonamide bond, means a functional group in which at least one carbon atom in the divalent saturated hydrocarbon group is replaced with an ether bond, an amide bond, a carbonyl bond, a sulfone bond, or a sulfonamide bond.

From the standpoint of improved water solubility of the monomer, L is preferably a divalent saturated hydrocarbon group containing at least one bond selected from the group consisting of an ether bond, an amide bond, a carbonyl bond, a sulfone bond and a sulfonamide bond, more preferably a divalent saturated hydrocarbon group containing an ether bond, particularly preferably that containing an oxyalkylene group such as an oxyethylene group, an oxypropylene group or an oxybutylene group. A divalent saturated hydrocarbon group containing at least one bond selected from the group consisting of an ether bond, an amide bond, a carbonyl bond, a sulfone bond and a sulfonamide bond may contain a plurality of repeating units each containing one of the aforesaid bonds. The number of the repeating units containing the bond is preferably 1 to 10, more preferably 1 to 5 from the standpoint of the water resistance of a cured product. When the oxyalkylene group is contained, the repetition number is preferably 1 to 5 from the standpoint of the water resistance of a cured product.

From the standpoint of satisfying both the water solubility of the monomer and the water resistance of a cured product, the curable material preferably contains a bifunctional polymerizable monomer (first polymerizable monomer) wherein L in formula (1) is a divalent saturated hydrocarbon group containing at least one bond selected from the group consisting of an ether bond, an amide bond, a carbonyl bond, a sulfone bond and a sulfonamide bond, and a bifunctional polymerizable monomer (second polymerizable monomer) wherein L in formula (1) is a divalent saturated hydrocarbon group containing no at least one bond selected from the group consisting of an ether bond, an amide bond, a carbonyl bond, a sulfone bond and a sulfonamide bond. The content of the first polymerizable monomer in the ink is preferably 10 to 90 mass %, more preferably 25 to 75 mass % based on the total content of the first polymerizable monomer and the second polymerizable monomer in the ink. The specific structure of the bifunctional polymerizable monomer represented by general formula (1) is shown in Table 1 below, but the bifunctional polymerizable monomer represented by general formula (1) is not limited to these structures.

TABLE 1

| | |
|---|---|
| Curable substance 1 | 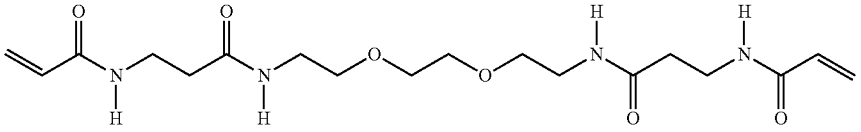 [SMILES: C=CC(=O)NCCC(=O)NCCOCCOCCNC(=O)CCNC(=O)C=C] |
| Curable substance 2 | 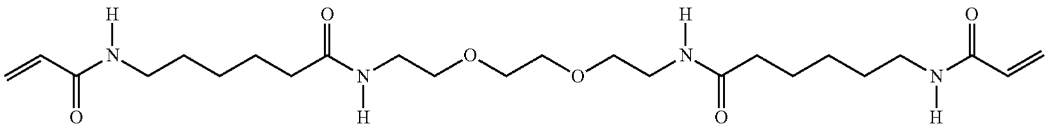 [SMILES: C=CC(=O)NCCCCCC(=O)NCCOCCOCCNC(=O)CCCCCNC(=O)C=C] |
| Curable substance 3 | 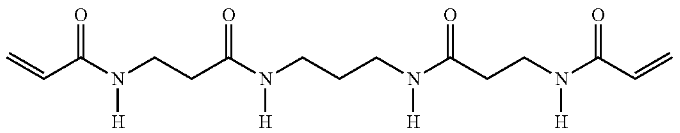 [SMILES: C=CC(=O)NCCC(=O)NCCCNC(=O)CCNC(=O)C=C] |
| Curable substance 4 | 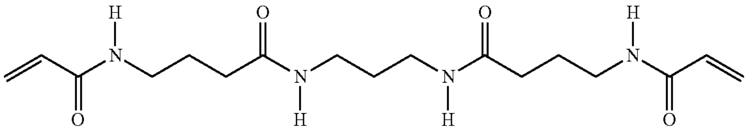 [SMILES: C=CC(=O)NCCCC(=O)NCCCNC(=O)CCCNC(=O)C=C] |
| Curable substance 5 | 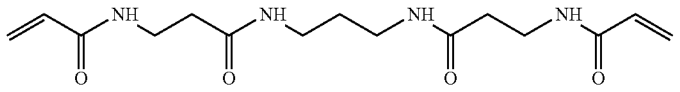 [SMILES: C=CC(=O)NCCC(=O)NCCCNC(=O)CCNC(=O)C=C] |

TABLE 1-continued

| | |
|---|---|
| Curable substance 6 | 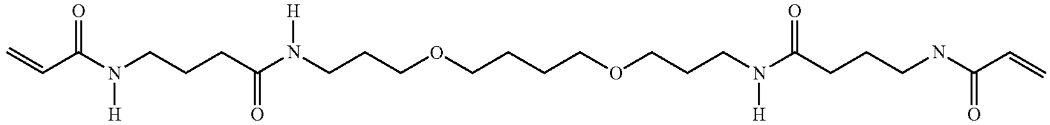 [SMILES: C=CC(=O)NCCCC(=O)NCCCOCCCCOCCCNC(=O)CCCNC(=O)C=C] |
| Curable substance 7 | 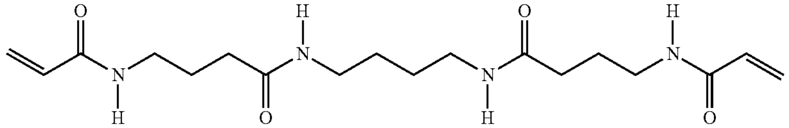 [SMILES: C=CC(=O)NCCCC(=O)NCCCCNC(=O)CCCNC(=O)C=C] |
| Curable substance 8 | 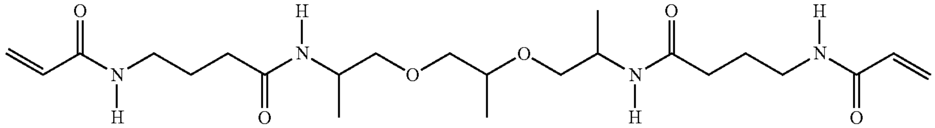 [SMILES: C=CC(=O)NCCCC(=O)NC(C)COCC(C)OCC(C)NC(=O)CCCNC(=O)C=C] |
| Curable substance 9 | 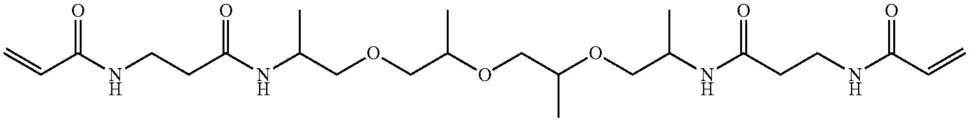 [SMILES: C=CC(=O)NCCC(=O)NC(C)COCC(C)OCC(C)OCC(C)NC(=O)CCNC(=O)C=C] |
| Curable substance 10 | 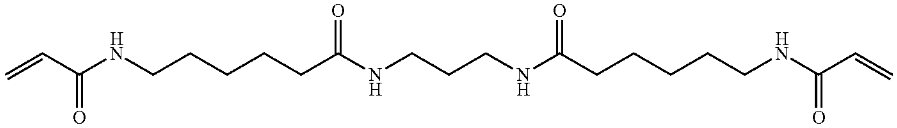 [SMILES: C=CC(=O)NCCCCCC(=O)NCCCNC(=O)CCCCCNC(=O)C=C] |
| Curable substance 11 | 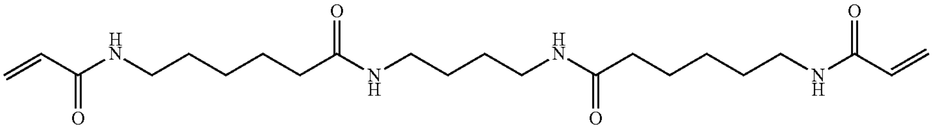 [SMILES: C=CC(=O)NCCCCCC(=O)NCCCCNC(=O)CCCCCNC(=O)C=C] |
| Curable substance 12 | 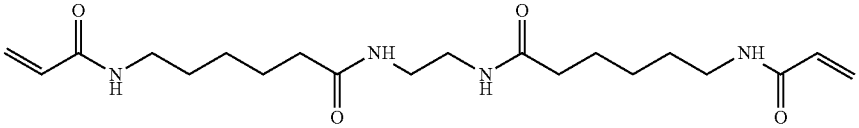 [SMILES: C=CC(=O)NCCCCCC(=O)NCCNC(=O)CCCCCNC(=O)C=C] |
| Curable substance 13 | 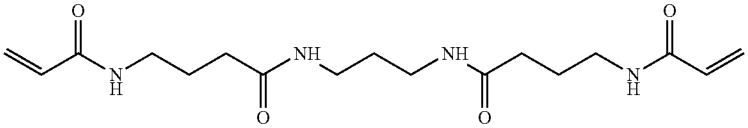 [SMILES: C=CC(=O)NCCCC(=O)NCCCNC(=O)CCCNC(=O)C=C] |
| Curable substance 14 | 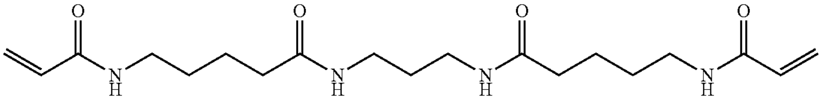 [SMILES: C=CC(=O)NCCCCC(=O)NCCCNC(=O)CCCCNC(=O)C=C] |
| Curable substance 15 | 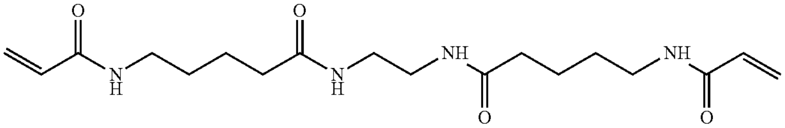 [SMILES: C=CC(=O)NCCCCC(=O)NCCNC(=O)CCCCNC(=O)C=C] |

Although the content of the curable substance containing the bifunctional polymerizable monomer of General Formula (1) is not particularly limited, it is preferably 50% by mass or less, more preferably 30% by mass or less based on the total mass of the aqueous ink, from the standpoint of ejection performance of the ink used in an ink jet system. From the standpoint of the gloss uniformity of an image, the content of 20% by mass or less is also preferred. From the standpoint of the stability of a cured product, on the other hand, the content of the curable substance containing the bifunctional polymerizable monomer of General Formula (1) is preferably 5% by mass or more, more preferably 10% by mass or more, based on the total mass of the aqueous ink.

Although a method of synthesizing the bifunctional polymerizable monomer of General Formula (1) is not particularly limited, examples include a method of performing a condensation reaction between an amine compound and (meth)acrylic acid chloride, (meth)acrylic anhydride or (meth)acrylic acid and a method of performing an exchange reaction between an amine compound and an ester compound. In the present disclosure, the term "(meth)acrylic acid" means "acrylic acid" or "methacrylic acid". This also applies to "(meth)acrylamide" or the like.

The active energy ray-curable aqueous ink of the present disclosure may also contain a plurality of the bifunctional polymerizable monomers represented by General Formula (1) in combination as needed. The curable substance may also contain a monomer not corresponding to General Formula (1) without damaging the advantage of the present disclosure. The monomer not corresponding to General Formula (1) is not limited as long as it is a monomer polymerizable with the bifunctional polymerizable monomer represented by General Formula (1) and a vinyl-based monomer having similar reactivity is preferred. Example of a monofunctional monomer include acryloylmorpholine, N-vinylpyrrolidone, acrylamide, hydroxyethyl acrylamide, monoacrylic esters of oligoethylene oxide and monoacrylic esters of a dibasic acid. Examples of a polyfunctional monomer include methylenebis-acrylamide, ethylenebis-acrylamide, 1,2-dihydroxyethylene-bisacrylamide, and polyfunctional acrylamide. Examples of commercially available products of the polyfunctional monomers includes FOM-03006 (water-soluble tetrafunctional acrylamide), FOM-03007 (water-soluble trifunctional acrylamide) and FOM-03009 (water-soluble tetrafunctional acrylamide) (all are trade names; product of Fujifilm Wako Chemicals). The monomer not corresponding to General Formula (1) preferably has at least one (meth)acrylamide group, particularly preferably acrylamide group, as a functional group. The aqueous ink preferably contains a monofunctional monomer together with a bifunctional monomer represented by formula (1). Thus, the water solubility of the bifunctional monomer represented by formula (1) can be further improved.

When the curable substance contains the monomer not corresponding to General Formula (1), the proportion of the bifunctional polymerizable monomer of General Formula (1) is preferably 5% by mass or more to less than 100% by mass, more preferably 10% by mass or more to 90% by mass or less, still more preferably 20% by mass or more to 80% by mass or less, each based on the total mass of the curable substance. When the proportion of the bifunctional polymerizable monomer of General Formula (1) is 5% by mass or more based on the total mass of the curable substance, the advantage of the present disclosure is fully exhibited.

When the curable substance contains the monofunctional monomer not corresponding to General Formula (1) by 50% by mass or more based on the total mass of the curable substance, the proportion of the bifunctional polymerizable monomer of General Formula (1) is preferably 25% by mass or more based on the total mass of the curable substance. When the proportion of the bifunctional polymerizable monomer of General Formula (1) is 25% by mass or more based on the total mass of the curable substance, a cured product with sufficient water resistance can be obtained.

When the curable substance contains the polyfunctional monomer, that is, a monomer having two or more functional groups, not corresponding to General Formula (1) by 10% by mass or more based on the total mass of the curable substance, the proportion of the bifunctional polymerizable monomer of General Formula (1) is preferably 25% by mass or more, more preferably 40% by mass or more based on the total mass of the polyfunctional monomer, that is, the monomer having two or more functional groups, not corresponding to General Formula (1). When the proportion of the bifunctional polymerizable monomer of General Formula (1) is 25% by mass or more based on the total mass of the curable substance, a crack-resistant cured product can be obtained.

(Polymerization Initiator)

The aqueous ink according to the present disclosure preferably contains a polymerization initiator further. The polymerization initiator is not particularly limited as long as it forms an active species that initiates the polymerization of the curable substance by the irradiation with an active energy ray. The curing reaction of the curable substance of the present disclosure is promoted by a radical so that a polymerization initiator forming a radical is preferred.

For the use of an aqueous ink, the structure of the polymerization initiator preferably has a hydrophilic functional group. Examples of the hydrophilic functional group include a hydroxyl group, a carboxylic acid group, a sulfonic acid group, a phosphoric acid group, a carboxylate group, a sulfonate group, a phosphonate group, an ether group and amide group.

The following compounds A to C are preferred examples of the polymerization initiator, but the polymerization initiator of the present disclosure is not limited to them.

compound•A

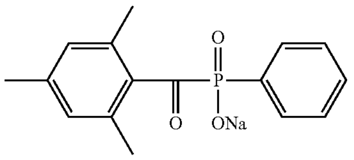

compound•B

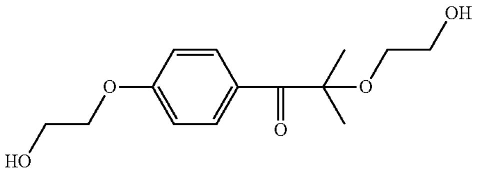

compound•C

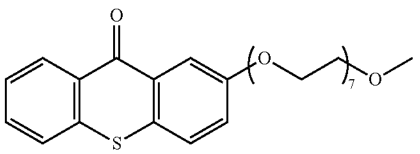

As the polymerization initiator, two or more polymerization initiators may be used in combination as needed. Alternatively, a polymerization initiator may be used in combination with a sensitizer. Combined use of two or more polymerization initiators or a polymerization initiator and a sensitizer makes it possible to use an active energy ray having a wavelength which a single polymerization initiator cannot effectively use and thereby generate a further radical.

The content of the polymerization initiator is preferably 0.01% by mass to 20% by mass, more preferably 0.01% by mass to 10% by mass, still more preferably 0.01% by mass to 5% by mass, each based on the total mass (100% by mass) of the aqueous ink. When the content of the polymerization initiator is too large, an unreacted polymerization initiator may remain in a cured product and the cured product thus obtained may have reduced strength.

(Coloring Material)

The aqueous ink according to the present disclosure may contain a coloring material as needed. The coloring material is not particularly limited and generally, dyes or pigments or dispersions thereof are preferred.

It is to be noted that the aqueous ink not containing a coloring material is a so-called clear ink and can be used separately for the purpose of giving a gloss to a printed surface therewith.

The dye is not limited and conventional dyes can be used without any problems. Examples include C.I. Direct Blue 6, 8, 22, 34, 70, 71, 76, 78, 86, 142 and 199, C.I. Acid Blue 9, 22, 40, 59, 93, 102, 104, 117, 120, 167 and 229, C.I. Direct Red 1, 4, 17, 28, 83 and 227, C.I. Acid Red 1, 4, 8, 13, 14, 15, 18, 21, 26, 35, 37, 249, 257 and 289, C.I. Direct Yellow 12, 24, 26, 86, 98, 132 and 142, C.I. Acid Yellow 1, 3, 4, 7, 11, 12, 13, 14, 19, 23, 25, 34, 44 and 71, C.I. Food Black 1 and 2 and C.I. Acid Black 2, 7, 24, 26, 31, 52, 112 and 118.

The pigment is not limited and conventional pigments can be used without any problems. Examples include C.I. Pigment Blue 1, 2, 3, 15:3, 16 and 22, C.I. Pigment Red 5, 7, 12, 48(Ca), 48(Mn), 57(Ca), 112 and 122, C.I. Pigment Yellow 1, 2, 3, 13, 16 and 83, Carbon Black Nos. 2300, 900, 33, 40 and 52, MA7, MA8 and MCF88 (products of Mitsubishi Chemical Corporation), RAVEN1255 (product of Columbia), REGAL330R, 660R and MOGUL (product of Cabot Corporation) and Color Black FW1, FW18, S170, S150 and Printex35 (product of Degussa AG).

When such a coloring material is used, the aqueous ink preferably contains a dispersing resin for dispersing the dye or pigment in water. The dispersing resin is preferably water soluble and has a weight average molecular weight of about 1000 to 15000. Examples include block copolymers and random copolymers, each composed of the following monomer, and salts of the copolymers.

- styrene and derivatives thereof
- vinylnaphthalene and derivatives thereof
- aliphatic alcohol esters of an α,β-ethylenically unsaturated carboxylic acid
- acrylic acid and derivatives thereof
- maleic acid and derivatives thereof
- itaconic acid and derivatives thereof
- fumaric acid and derivatives thereof Alternatively, the dye or pigment can be dispersed by the curable substance without using the dispersing resin.

In the present disclosure, the form of the ink is not limited and the ink may be used in any form such as a self dispersion type, a resin dispersion type and a microcapsule type.

(Solvent)

The aqueous ink according to the present disclosure contains at least water as a solvent and may contain an organic solvent as needed to control the ink application property or drying property. The organic solvent used is preferably a water soluble material having a high boiling point and a low vapor pressure. Examples include polyethylene glycol, polypropylene glycol, ethylene glycol, propylene glycol, butylene glycol, triethylene glycol, thiodiglycol, hexylene glycol, diethylene glycol, ethylene glycol monomethyl ether, diethylene glycol monomethyl ether and glycerin. In addition, an alcohol such as ethyl alcohol or isopropyl alcohol or various surfactants may also be added as a component for regulating the viscosity, surface tension or the like.

The content of the solvent including water is selected as needed depending on the intended use and it is preferably 10% by mass or more based on the total mass of the aqueous ink. Particularly when the ink is used in an ink jet recording system, the content is preferably 30% by mass or more, more preferably 50% by mass or more. The upper limit of the content of the solvent including water is not particularly limited and it is preferably 90% by mass or less, more preferably 80% by mass or less based on the total mass of the aqueous ink. The content of water is preferably 10% by mass or more, more preferably 30% by mass or more, still more preferably 50% by mass or more, each based on the total mass of the aqueous ink. The upper limit of the water content is not particularly limited and it is preferably 90% by mass or less, more preferably 80% by mass or less based on the total mass of the aqueous ink. The aqueous ink may further include a surfactant, a curing accelerator, a cross-linking agent, a water-soluble auxiliary, a viscosity modifier, and the like. It should be noted that the surfactant or the like may be suitably selected and used.

<Recording Method and Recording Apparatus>

The aqueous ink according to the present disclosure can be used in various known recording systems such as ink jet system, gravure system and flexographic system and it brings an excellent advantage particularly when used in an ink jet recording system.

The recording method according to the present disclosure has at least a step of applying the active energy ray-curable aqueous ink of the present disclosure onto a recording medium and a step of irradiating the active energy ray-curable aqueous ink applied onto the recording medium with an active energy ray. Particularly, the ink application step may be performed by any recording system such as ink jet system, gravure system or flexographic system capable of applying the aqueous ink of the present disclosure to a recording medium and of them, an ink jet recording system is preferred.

(Recording Medium)

Any medium may be used as a recording medium as long as it can retain the aqueous ink of the present disclosure. Particularly in an ink jet recording system, a medium having a small thickness such as sheet or film is preferred. In addition, media having various absorption characteristics, for example, absorptive media such as paper capable of absorbing the ink applied thereto, poorly absorptive media such as gloss paper for offset printing and non-absorptive media such as PET, PC, PVC and PMMA can be used as the recording medium.

The recording apparatus according to the present disclosure has at least an ink application device for applying the active energy ray-curable aqueous ink of the present disclosure onto a recording medium and an active energy ray irradiation device for irradiating the active energy ray-curable aqueous ink applied onto the recording medium with an active energy ray. The ink application device may have any recording system as long as it can apply the aqueous ink of the present disclosure to a recording medium. It is preferably equipped with a recording head which ejects an ink by an ink jet recording system. The ink jet recording system is preferably a system of giving heat energy to an ink and thereby ejecting the ink, which system can easily achieve a high-density multi-orifice type recording head and record a high-resolution and high-quality image at high speed.

As the recording head having a system of giving heat energy to an ink and thereby ejecting the ink, that using a basic principle disclosed, for example, in U.S. Pat. Nos. 4,723,129 and 4,740,796 is preferred. Such a system can be applied to both a so-called on-demand type and a continuous type. For the on-demand type, at least one driving signal which causes a rapid temperature rise according to recording information and exceeding the nucleate boiling is preferably applied to an electrothermal converter placed corresponding to an ink retaining sheet or liquid path. Thus, the electrothermal converter is caused to generate heat energy and produce film boiling on the heat acting surface of the recording head. As a result, a bubble can be formed in the ink corresponding to each of the driving signals and therefore, this system is effective.

By ejecting an ink from an ejection orifice by making use of the growth and contraction of a bubble, at least one droplet is formed. When the driving signal is in the form of a pulse, the growth and contraction of a bubble can be effected instantaneously and appropriately. The ink can therefore be ejected with a particularly good response, which is preferred. As the driving signal in the form of a pulse, that described in U.S. Pat. No. 4,463,359 or 4,345,262 is suited. It is preferred to employ the conditions described in U.S. Pat. No. 4,313,124 for a temperature increasing rate of the heat acting surface.

As the structure of the recording head, a structure (straight liquid path or right-angle liquid path) having an ejection orifice, a liquid path and an electrothermal converter in combination as disclosed in the aforesaid specifications is suited. In addition, a structure having a heat acting portion in a bent region, as disclosed in U.S. Pat. Nos. 4,558,333 and 4,459,600, is also suited. Further, an air communication ejection system as described in Japanese Patent Nos. 2962880 and 3246949 and Japanese Patent Application Laid-Open No. H11(1999)-188870 is also effective. Still further, a structure having a common ejection orifice as an ejection orifice unit of a plurality of electrothermal converters (Japanese Patent Application Laid-Open No. 559(1984)-123670) is also effective.

As a full-line type recording head having a length corresponding to the width of the maximum recording medium on which the recording apparatus can record, the following ones can be used. For example, either a structure in which a plurality of recording heads as disclosed in the aforesaid specification is combined to cover the length or a structure having an integrally-formed recording head as a single recording head can be used. Further, a replaceable chip-type recording head which is attached to a recording apparatus to enable electric connection with the main body of the apparatus or enable ink supply from the main body of the apparatus or a cartridge type recording head integrally provided with the recording head is also effective.

Further, the recording head preferably has a recovery means or spare auxiliary means therefor. Specific examples of such means include capping means for a recording head, cleaning means, pressure application or suction means, electrothermal converters, heating elements, pre-heating means and preliminary ejection mode.

FIGURE is a perspective view schematically showing one embodiment of the structure of an ink jet recording apparatus. The ink jet recording apparatus shown in FIGURE is a recording apparatus employing a shuttle system which uses a short-length serial head and performs recording while scanning the head in the width direction of a recording medium. A carriage 100 is connected to an endless belt 101 and is movable along a guiding shaft 102. The endless belt 101 is bridged between pulleys 103 and 104. A driving shaft of a motor 105 is connected to the pulley 103 so that by the rotary drive of the motor 105, the carriage 100 reciprocates in the main scanning direction shown by Arrow A along the guiding shaft 102.

The carriage 100 has thereon a recording head (not shown) in which a plurality of ink ejection nozzles is arranged and an ink tank IT as a container for storing an ink therein. The carriage 100 has an active energy ray irradiation unit 20 at at least one end thereof in the main scanning direction shown by Arrow A. Immediately after the ink is applied onto the recording medium, a surface of a medium to be recorded can therefore be irradiated with an active energy ray from the active energy ray irradiation unit 20. Examples of the active energy ray include an electron ray, an ultraviolet ray, an α ray, a β ray, a γ ray and an X ray. Of these, an ultraviolet ray is particularly preferred. This active energy ray irradiation unit 20 is an active energy ray irradiation device which irradiates the ink applied onto a recording medium with an active energy ray. In FIGURE, the carriage 100 has the active energy ray irradiation unit 20 at both ends thereof. Irradiation with an active energy ray may be performed immediately after the application of an ink as shown in this drawing or may be performed after a certain interval after the ink application. Irradiation is not limited to single irradiation and multistage irradiation may also be performed.

The recording head has a plurality of ink ejection orifices arranged on the ejection orifice surface opposite to paper P serving as a recording medium in the feed direction (a sub-scanning direction shown by Arrow B) of paper P. The recording head has ink paths respectively communicated to a plurality of ejection orifices. Electrothermal converters which generate heat energy to eject an ink are provided for ink paths, respectively.

The electrothermal converter generates heat when an electrical pulse corresponding to drive data is applied thereto, causes film boiling of the ink by the resulting heat, generates a bubble and thereby ejects the ink from the ejection orifice. To the respective ink paths, a common liquid chamber, which is common thereto, is communicated and the common liquid chamber is connected to the ink tank IT.

The ink jet recording apparatus shown in FIGURE has a linear encoder 106 for detecting the moving position of the carriage 100. Described specifically, a linear scale 107 provided along the moving direction of the carriage 100 has, for example, equally spaced 1,200 slits in a 1-inch distance. On the side of the carriage 100, for example, a slit detection system 108 having a light emitting unit and a light receiving sensor, and a signal processing circuit are provided. From the linear encoder 106, therefore, an ejection timing signal showing an ejection timing of the ink and information of the moving position of the carriage 100 are output in response to the movement of the carriage 100. Since the ink is ejected whenever the slit of the linear scale 107 is detected, an image having a resolution of 1,200 dpi can be recorded in the main scanning direction.

Paper P as a recording medium is intermittently fed in the sub-scanning direction shown by Arrow B which is a direction orthogonal to the operation direction of the carriage 100. The paper P is supported by a pair of roller units 109 and 110 on the upstream side in the feed direction and a pair of roller units 111 and 112 on the downstream side in the feed direction. The paper is fed while a constant tension is applied thereto and flatness relative to the recoding head is maintained. The driving force to the roller units 111 and 112 is supplied from a paper feed motor not shown.

In the ink jet recording apparatus shown in FIGURE, an image can be recorded on the whole paper P by alternately repeating recording of a width corresponding to the arrangement width of the ejection orifices of the recording head and feeding of paper P, while moving the carriage 100. The carriage 100 stops at a home position as needed when recording is started or during recording. A cap member 113 for capping the ejection surface side of each recording head is provided at this home position. To the cap member 113, a suction recovery means (not shown) for forcibly sucking the ink from the ejection orifice to prevent clogging of the ejection orifice is connected.

As well as the shuttle system, there is a line system using a line head in which recording elements are arranged corresponding to the entire region for one side of a recording medium. In the line system, an image is recorded on the whole surface of a recording medium by scanning the recording medium in a direction orthogonal to the arrangement direction of the recording elements. A feed system such as a carriage which scans a short-length head therefore becomes unnecessary. In addition, since complex scanning control between the movement of the carriage and the recording medium becomes unnecessary and only the recording medium moves, the recording speed can be made higher than that of the shuttle system.

According to one aspect of the present disclosure, an active energy ray-curable aqueous ink containing a monomer excellent in water solubility and, when cured, having excellent water resistance can be provided.

According to the other aspect of the present disclosure, a recording method and a recording apparatus, each using the active energy ray-curable aqueous ink can be provided.

EXAMPLES

The present disclosure will hereinafter be described in further detail by Examples and Comparative Examples. The present disclosure is not limited by the following Examples without departing from the gist of the invention.

In the Examples of the present disclosure, Curable substances 1 to 4, 12 listed in Table 2 were used as the bifunctional polymerizable monomer. In the Comparative Examples, Comparative compounds 1 and 2 listed in Table were used as the bifunctional polymerizable monomer. Further, as the other monomer not corresponding to the monomer of General Formula (1) and to be mixed with an aqueous ink, monomers listed in Table 3 were used. The comparative compound 1 described in Table 2 is trade name FOM-3008 (manufactured by Fujifilm Wako Pure Chemical Industries, Ltd.). The monofunctional monomer 1 in Table 3 is trade name HEAA (manufactured by KJ Chemicals, Inc.), the monofunctional monomer 2 is trade name ACMO (manufactured by KJ Chemicals, Inc.), the monofunctional monomer 3 is trade name DAAM (manufactured by KJ Chemicals, Inc.), the bifunctional monomer in Table 3 is N, N-ethylene bisacrylamide (manufactured by Tokyo Kasei, Inc.), and the trifunctional monomer in Table 3 is trade name FOM-03007 (manufactured by Fujifilm Wako Pure Chemical Industries, Inc.). The comparative compound 2 described in Table was synthesized by the following method. [Synthesis Example A: Method for Synthesizing Comparative Compound 2]

200 g (1.35 mol) of 1,2-bis (2-aminoethoxy) methane and 4 L of acetonitrile were mixed and 256 g (2.83 mol) of acrylic acid chloride was added dropwise while stirring while keeping the mixture at 8° C. or lower under ice cooling. Thereafter, the temperature was raised to 20° C., and the mixture was stirred for another 2 hours. After completion of the reaction, the reaction liquid was filtered. The reaction product separated by filtration was washed with acetonitrile to give 176.3 g of Comparative Compound 2.

TABLE 2

| Bifunctional polymerizable monomer | Structural formula |
|---|---|
| Curable substance 1 | 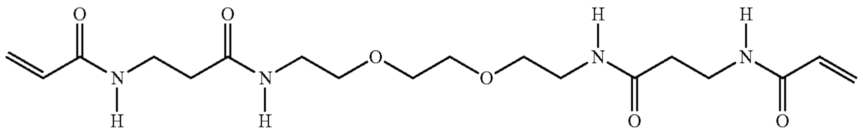 [SMILES: C=CC(=O)NCCC(=O)NCCOCCOCCNC(=O)CCNC(=O)C=C] |
| Curable substance 2 | 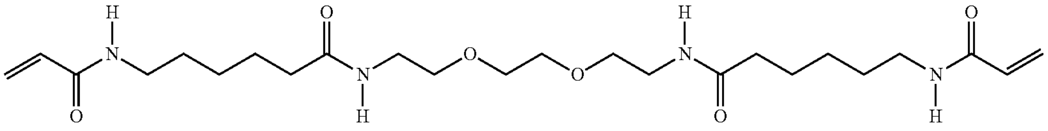 [SMILES: C=CC(=O)NCCCCCC(=O)NCCOCCOCCNC(=O)CCCCCNC(=O)C=C] |
| Curable substance 3 | 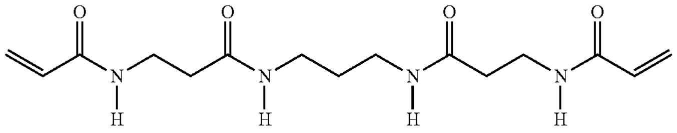 [SMILES: C=CC(=O)NCCC(=O)NCCCNC(=O)CCNC(=O)C=C] |
| Curable substance 4 | 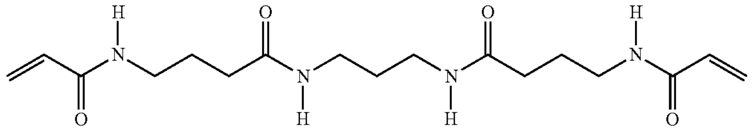 [SMILES: C=CC(=O)NCCCC(=O)NCCCNC(=O)CCCNC(=O)C=C] |
| Curable substance 12 | 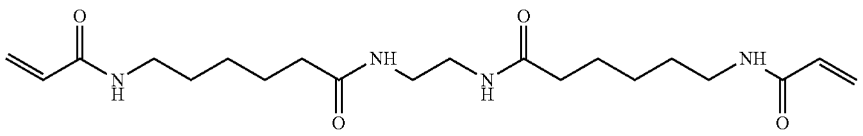 [SMILES: C=CC(=O)NCCCCCC(=O)NCCNC(=O)CCCCCNC(=O)C=C] |

TABLE 2-continued

| Bifunctional polymerizable monomer | Structural formula |
|---|---|
| Comparative compound 1 | 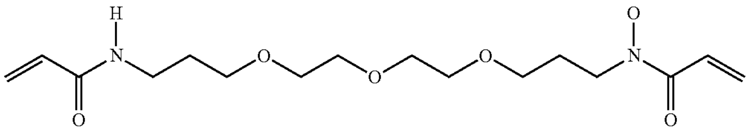 [SMILES: C=CC(=O)NCCCOCCOCCOCCCN(O)C(=O)C=C] |
| Comparative compound 2 | 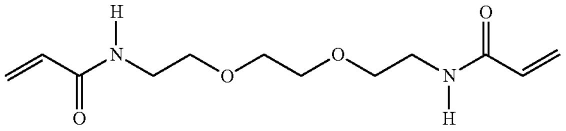 [SMILES: C=CC(=O)NCCOCCOCCNC(=O)C=C] |

TABLE 3

| The other monomer | Structural formula |
|---|---|
| Monofunctional monomer 1 | 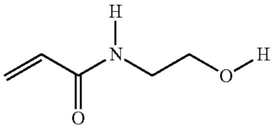 |
| Monofunctional monomer 2 | 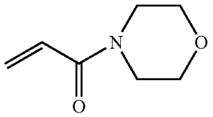 |
| Monofunctional monomer 3 | 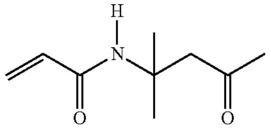 |
| Bifunctional monomer | 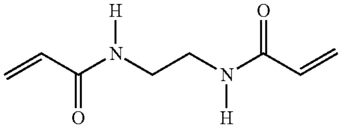 |
| Trifunctional monomer | 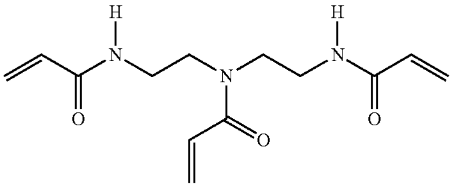 [SMILES: C=CC(=O)NCCN(CCNC(=O)C=C)C(=O)C=C] |

(Synthesis of Curable Substance)

The following is a method of synthesizing Curable substances 1 to 4, 12.

Synthesis Example 1: Method of Synthesizing Curable Substance 1

3-Acrylamidopropanoic acid (35.0 g, 0.24 mol) was mixed with 1 L of methanol. At room temperature (20° C.), 14.8 g (0.10 mol) of 1,2-bis(2-aminoethoxy)ethane was added and the resulting mixture was stirred for 30 minutes. To the reaction mixture was added 55.0 g (0.20 mol) of 4-(4,6-dimethoxy-1,3,5-triazin-2-yl)-4-methylmorpholinium chloride (DMT-MM), followed by stirring overnight. After completion of the reaction, the reaction mixture was filtered. After the filtrate thus obtained was concentrated, the concentrate was purified by column chromatography to obtain 27.5 g of Curable substance 1. The 3-acrylamidopropanoic acid was prepared by reacting 3-aminopropanoic acid with acrylic acid chloride, but the preparation process of it is not limited thereto.

Synthesis Example 2: Method of Synthesizing Curable Substance 2

6-Acrylamidohexanoic acid (45.0 g, 0.24 mol) was mixed with 1 L of methanol. To the resulting mixture was added 14.8 g (0.10 mol) of 1,2-bis(2-aminoethoxy)ethane at room temperature (20° C.) and the resulting mixture was stirred for 30 minutes. To the reaction mixture was added 55.0 g (0.20 mol) of DMT-MM, followed by stirring overnight. After completion of the reaction, the reaction mixture was filtered. After the filtrate thus obtained was concentrated, the concentrate was purified by column chromatography to obtain 32.7 g of Curable substance 2. The 6-acrylamidohexanoic acid was prepared by reacting 6-aminohexanoic acid with acrylic acid chloride, but the preparation process of it is not limited thereto.

Synthesis Example 3: Method of Synthesizing Curable Substance 3

3-Acrylamidopropanoic acid (35.0 g, 0.24 mol) was mixed with 1 L of methanol. To the resulting mixture was added 7.4 g (0.10 mol) of 1,3-diaminopropane at room temperature (20° C.) and the resulting mixture was stirred for 30 minutes. To the reaction mixture was added 55.0 g (0.20 mol) of DMT-MM, followed by stirring overnight. After completion of the reaction, the reaction mixture was filtered. After the filtrate thus obtained was concentrated, the concentrate was purified by column chromatography to obtain 22.9 g of Curable substance 3. The 3-acrylamidopropanoic acid was prepared by reacting 3-aminopropanoic acid with acrylic acid chloride, but the preparation process of it is not limited thereto.

Synthesis Example 4: Method of Synthesizing Curable Substance 4

3-Acrylamidobutanoic acid (37.7 g, 0.24 mol) was mixed with 1 L of methanol. To the resulting mixture was added 7.4 g (0.10 mol) of 1,3-diaminopropane at room temperature (20° C.) and the resulting mixture was stirred for 30 minutes. To the reaction mixture was added 55.0 g (0.20 mol) of DMT-MM, followed by stirring overnight. After completion of the reaction, the reaction mixture was filtered. After the filtrate thus obtained was concentrated, the concentrate was purified by column chromatography to obtain 24.6 g of Curable substance 4. The 3-acrylamidobutanoic acid was prepared by reacting 3-aminobutanoic acid with acrylic acid chloride, but the preparation process of it is not limited thereto.

Synthesis Example 5: Method of Synthesizing Curable Substance 12

6-Acrylamidohexanoic acid (45.0 g, 0.24 mol) was mixed with 1 L of methanol. To the resulting mixture was added 6.0 g (0.10 mol) of ethylenediamine at room temperature (20° C.) and the resulting mixture was stirred for 30 minutes. To the reaction mixture was added 55.0 g (0.20 mol) of DMT-MM, followed by stirring overnight. After completion of the reaction, the reaction mixture was filtered. After the filtrate thus obtained was concentrated, the concentrate was purified by column chromatography to obtain 20.1 g of Curable substance 12. The 6-acrylamidohexanoic acid was prepared by reacting 6-aminohexanoic acid with acrylic acid chloride, but the preparation process of it is not limited thereto.

Example 1

(Preparation of Aqueous Ink)

An aqueous ink was prepared with the following composition using the curable substance listed in Table 2.

Curable substance 1: 5% by mass
Monofunctional monomer 1: 15% by mass
Polymerization initiator (Compound A): 2% by mass
Surfactant "Acetylenol E100" (trade name, product of Kawaken Fine Chemicals): 1% by mass
Ion exchanged water: 77% by mass (Manufacture of Cured Product)

The aqueous ink (10 g/m$^2$) was applied to a PET film (easily adhesive white PET, product of Teijin Limited) by a bar coater. Then, the resulting film was irradiated with UV-LED (trade name: L60II, wavelength: 395 nm, product of Ushio Inc.) at 1 J/cm$^2$ to cure the ink and a cured product was manufactured.

Example 2

In a manner similar to that of Example 1 except that Curable substance 2 was used instead of Curable substance 1 as the bifunctional polymerizable monomer, an aqueous ink was prepared and a cured product was manufactured.

Example 3

In a manner similar to that of Example 1 except that Curable substance 3 was used instead of Curable substance 1 as the bifunctional polymerizable monomer, an aqueous ink was prepared and a cured product was manufactured.

Example 4

In a manner similar to that of Example 1 except that Curable substance 4 was used instead of Curable substance 1 as the bifunctional polymerizable monomer, an aqueous ink was prepared and a cured product was manufactured.

Example 5

In a manner similar to that of Example 1 except that 10% by mass of Curable substance 1 was used as the bifunctional polymerizable monomer and 10% by mass of Monofunctional monomer 1 was used, an aqueous ink was prepared and a cured product was manufactured.

Example 6

In a manner similar to that of Example 1 except that 20% by mass of Curable substance 1 was used as the bifunctional polymerizable monomer and Monofunctional monomer 1 was not used, an aqueous ink was prepared and a cured product was manufactured.

Example 7

In a manner similar to that of Example 1 except that Monofunctional monomer 2 was used as the monofunctional monomer, an aqueous ink was prepared and a cured product was manufactured.

Example 8

In a manner similar to that of Example 1 except that Monofunctional monomer 3 was used as the monofunctional monomer, an aqueous ink was prepared and a cured product was manufactured.

Example 9

In a manner similar to that of Example 5 except that the bifunctional monomer listed in Table 3 was used instead of the monofunctional monomer, an aqueous ink was prepared and a cured product was manufactured.

Example 10

In a manner similar to that of Example 5 except that the trifunctional monomer listed in Table 3 was used instead of the monofunctional monomer, an aqueous ink was prepared and a cured product was manufactured.

Example 11

(Preparation of Aqueous Magenta Ink)

After a pigment (C.I. Pigment Red 122), a dispersing agent (a random copolymer of styrene, acrylic acid and ethyl acrylate, weight average molecular weight: 3,500, acid value: 150 mgKOH/g) and ion exchanged water were mixed, the resulting mixture was subjected to dispersion treatment with beads mill to obtain a magenta pigment dispersion having a pigment solid content of 10% by mass and a pigment:dispersing agent mass ratio of 3:1. Then, after mixing and sufficient stirring of the following components, the resulting mixture was subjected to pressure filtration with a filter having a pore size of 0.5 μm to obtain an aqueous magenta ink.

Magenta pigment dispersion: 40% by mass
Curable substance 1: 5% by mass
Monofunctional monomer 1: 15% by mass
Polymerization initiator (Compound A): 2% by mass
Surfactant "Acetylenol E100" (trade name, product of Kawaken Fine Chemicals): 1% by mass
Ion exchanged water: 36% by mass (Manufacture of Cured Product)

The aqueous magenta ink prepared in Example 11 was loaded as a magenta ink in an on-demand type ink jet recording apparatus ("Pro-10", trade name; product of Canon Inc.) which applies heat energy corresponding to a recording signal to an ink and thereby ejecting it. A UV-LED irradiation device ("M30", trade name; product of Ushio Inc., wavelength: 395 nm) was loaded at a portion of the recording apparatus adjacent to a recording head. More specifically, as shown in FIGURE, the aforesaid irradiation device was loaded on the carriage 100 as the active energy ray irradiation unit 20. By the ink jet recording apparatus thus obtained, one-pass printing of a solid image with a duty of 100% on a PET film (easily adhesive white PET, product of Teijin Limited) was performed and then, the ink was cured by the irradiation at 2 J/cm$^2$. Thus, a cured product was manufactured. An image recorded by the ink jet recording apparatus under such a condition that eight ink droplets, each 3.8 ng, are applied to a unit region of 1/600 inch×1/600 inch is defined as an image with a duty of 100%.

Example 12

An aqueous magenta ink was prepared in the same manner as in Example 11 except that an ink was prepared by using 2 mass % of the curable substance 1 and 3 mass % of the curable substance 12 instead of 5 mass % of the curable substance 1, and a cured product was prepared in the same manner as in Example 11.

Comparative Example 1

In a manner similar to that of Example 1 except that Comparative Compound 1 was used instead of Curable substance 1 as the bifunctional polymerizable monomer, an aqueous ink was prepared and a cured product was manufactured.

Comparative Example 2

In a manner similar to that of Example 1 except that Comparative Compound 2 was used instead of Curable substance 1 as the bifunctional polymerizable monomer, an aqueous ink was prepared and a cured product was manufactured.

Comparative Example 3

In a manner similar to that of Example 11 except that Comparative Compound 1 was used instead of Curable substance 1 as the bifunctional polymerizable monomer, a magenta aqueous ink was prepared and a cured product was manufactured.

(Evaluation)

The aqueous inks and cured products obtained under the aforesaid conditions were evaluated by the following evaluation methods.

The evaluation results are shown in the following tables. In each evaluation item in the present disclosure, evaluation criteria A to C were defined as an acceptable level and D was defined as an unacceptable level.

<Water Solubility>

When a bifunctional polymerizable monomer is mixed with ion exchanged water at 25° C. and the concentration at which no insoluble matter is found as a result of visual observation of the resulting mixture is shown as water solubility. Higher water solubility is preferred and the evaluation criteria is as follows.

A: no insoluble matter is found at 20% by mass
B: no insoluble matter is found at 5% by mass
C: no insoluble matter is found at 1% by mass
D: an insoluble matter is found at 1% by mass <Water Resistance>

Twenty four hours after the manufacture of a cured product, 0.2 ml of ion exchanged water was added dropwise onto the cured product. One minute later, Silbon paper was placed thereon and then, pulled under a load of 40 g/cm$^2$. Whether peeling of the cured product occurred or not was visually observed. Further, whether the Silbon paper was stained or not due to the friction of the cured product was visually observed. The following are evaluation criteria.

A: peeling of the cured product due to the friction accounts for less than 3% and a region from which no stain is observed accounts for 90% or more of the area of the Silbon paper
B: peeling of the cured product due to the friction accounts for less than 10% and a region from which no stain is observed accounts for 70% or more of the area of the Silbon paper
C: peeling of the cured product due to the friction accounts for less than 30% and a region from which no stain is observed accounts for 50% or more of the area of the Silbon paper
D: peeling of the cured product due to friction accounts for 30% or more and a region from which no stain is observed accounts for less than 20% of the area of the Silbon paper The results of the water solubility of Curable substances 1 to 4, 12 used in Examples and Comparative Compounds 1 and 2 used in Comparative Examples are shown in Table 3.

TABLE 4

| Bifuctional polymerizable monomer | Water solubility |
|---|---|
| Curable substance 1 | A |
| Curable sustance 2 | C |
| Curable substance 3 | B |
| Curable substance 4 | B |
| Curable substance 12 | C |
| Comparative compound 1 | A |
| Comparative compound 2 | A |

The composition of the aqueous inks and the aqueous magenta inks of Examples 1 to 12 and Comparative Examples 1 to 3 and evaluation results of their water resistance are shown in Table 5.

TABLE 5

| | Bifunctional polymerizable monomer | Content (% by mass) | Other monomers | Content (% by mass) | Water resistance |
|---|---|---|---|---|---|
| Example 1 | Curable substance 1 | 5 | Monofunctional monomer 1 | 15 | B |
| Example 2 | Curable substance 2 | 5 | Monofunctional monomer 1 | 15 | A |
| Example 3 | Curable substance 3 | 5 | Monofunctional monomer 1 | 15 | A |
| Example 4 | Curable substance 4 | 5 | Monofunctional monomer 1 | 15 | A |
| Example 5 | Curable substance 1 | 10 | Monofunctional monomer 1 | 10 | B |
| Example 6 | Curable substance 1 | 20 | — | — | C |
| Example 7 | Curable substance 1 | 5 | Monofunctional monomer 2 | 15 | B |
| Example 8 | Curable substance 1 | 5 | Monofunctional monomer 3 | 15 | A |
| Example 9 | Curable substance 1 | 10 | Bifunctional monomer | 10 | A |
| Example 10 | Curable substance 1 | 10 | Trifunctional monomer | 10 | A |
| Example 11 | Curable substance 1 | 5 | Monofunctional monomer 1 | 15 | B |
| Example 12 | Curable substance 1 | 2 | Monofunctional monomer 1 | 15 | A |
| | Curable substance 12 | 3 | | | |
| Comparative Example 1 | Comparative compound 1 | 5 | Monofunctional monomer 1 | 15 | D |
| Comparative Example 2 | Comparative compound 2 | 5 | Monofunctional monomer 1 | 15 | D |
| Comparative Example 3 | Comparative compound 1 | 5 | Monofunctional monomer 1 | 15 | D |

The disclosure of this embodiment includes the following configuration and method.

(Configuration 1) An active energy ray-curable aqueous ink comprising water and a curable substance and curable by an active energy ray, wherein the curable substance comprises a bifunctional polymerizable monomer represented by the following General Formula (1):

(1)

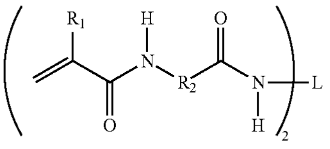

wherein, $R_1$ is a hydrogen atom or a methyl group, $R_2$ is a divalent saturated hydrocarbon group having 1 to 5 carbon atoms and L is a divalent saturated hydrocarbon group which may contain an ether bond, an amide bond, a carbonyl bond, a sulfone bond or a sulfonamide bond.

(Configuration 2) The active energy ray-curable aqueous ink according to configuration (Configuration 1, wherein the L is a divalent saturated hydrocarbon group containing at least one bond selected from the group consisting of an ether bond, an amide bond, a carbonyl bond, a sulfone bond and a sulfonamide bond and the number of a repeating unit containing the bond is 1 to 5.

(Configuration 3) The active energy ray-curable aqueous ink according to configuration 1 or 2, wherein the content of a solvent containing water is 50% by mass or more based on the total mass of the active energy ray-curable aqueous ink.

(Configuration 4) The active energy ray-curable aqueous ink according to any one of configurations 1 to 3, further comprising a polymerization initiator which forms an active species to start the polymerization of the curable substance by irradiation with an active energy ray.

(Configuration 5) The active energy ray-curable aqueous ink according to any one of configurations 1 to 4, further comprising a coloring material.

(Configuration 6) The active energy ray-curable aqueous ink according to any one of configurations 1 to 5, wherein the curable substance further contains a monomer not corresponding to General Formula (1) and a proportion of the bifunctional polymerizable monomer represented by General Formula (1) is 20% by mass or more to 80% by mass or less based on the total mass of the curable substance.

(Configuration 7) The active energy ray-curable aqueous ink according to configuration 6, wherein the monomer not corresponding to General Formula (1) is a monomer having at least one (meth)acrylamide group as a functional group.

(Configuration 8) The active energy ray-curable aqueous ink according to configuration 6 or 7, further comprising a monofunctional monomer as the monomer not corresponding to General Formula (1) by 50% by mass or more based on the total mass of the curable substance and a proportion of the bifunctional polymerizable monomer of General Formula (1) is 25% by mass or more based on the total mass of the curable sub stance.

(Configuration 9) The active energy ray-curable aqueous ink according to configuration 6 or 7, further comprising a polyfunctional monomer as the monomer not corresponding to General Formula (1) by 10% by mass or more based on the total mass of the curable substance and a proportion of the bifunctional polymerizable monomer of General Formula (1) is 40% by mass or more based on the total mass of the polyfunctional monomer not corresponding to General Formula (1).

(Method 1) A recording method, comprising at least the steps of:

applying the active energy ray-curable aqueous ink as claimed in any one of configurations 1 to 9 onto a recording medium and irradiating the active energy ray-curable aqueous ink applied onto the recording medium with an active energy ray.

(Method 2) The recording method according to method 1, wherein the step of applying the ink is performed by an ink jet recording system.

(Configuration 10) A recording apparatus, comprising at least:

an ink application device which applies the active energy ray-curable aqueous ink as claimed in any one of configurations 1 to 9 onto a recording medium and an active energy ray irradiation device which irradiates the active energy ray-curable aqueous ink applied onto the recording medium with an active energy ray.

(Configuration 11) The recording apparatus according to configuration 10, wherein the ink application device is equipped with a recording head which ejects an ink by an ink jet recording system.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-087769, filed May 25, 2021, and Japanese Patent Application No. 2022-081503, filed May 18, 2022, which are hereby incorporated by reference herein in their entirety.

What is claimed is:

1. An active energy ray-curable aqueous ink comprising water and a curable substance, wherein the curable substance comprises:

a bifunctional polymerizable monomer represented by formula (1):

(1)

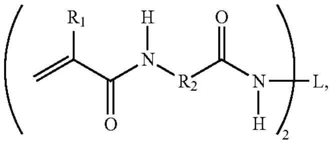

wherein $R_1$ is a hydrogen atom or a methyl group, $R_2$ is a divalent saturated hydrocarbon group having 1 to 5 carbon atoms and L is a divalent saturated hydrocarbon group which may contain an ether bond, an amide bond, a carbonyl bond, a sulfone bond or a sulfonamide bond; and a polyfunctional monomer not corresponding to the formula (1) and having at least one (meth)acrylamide group as a functional group, wherein a content of the polyfunctional monomer not corresponding to the formula (1) is 10% by mass to 80% by mass based on a total mass of the curable substance, and wherein a content of the bifunctional polymerizable monomer represented by the formula (1) is (i) 20% by mass to 80% by mass based on the total mass of the curable substance and (ii) 40% by mass to 80% by mass based on a total mass of the polyfunctional monomer not corresponding to the formula (1).

2. The active energy ray-curable aqueous ink according to claim 1, wherein the L is a divalent saturated hydrocarbon group containing at least one bond selected from the group consisting of an ether bond, an amide bond, a carbonyl bond, a sulfone bond and a sulfonamide bond, and a number of repeating units containing the bond is 1 to 5.

3. The active energy ray-curable aqueous ink according to claim 1, wherein a content of a solvent containing water is 50% by mass or more based on a total mass of the active energy ray-curable aqueous ink.

4. The active energy ray-curable aqueous ink according to claim 1, further comprising a polymerization initiator which forms an active species to start polymerization of the curable substance by irradiation with an active energy ray.

5. The active energy ray-curable aqueous ink according to claim 1, further comprising a coloring material.

6. A recording method, comprising at least the steps of:

applying an active energy ray-curable aqueous ink onto a recording medium; and irradiating the active energy ray-curable aqueous ink applied onto the recording medium with an active energy ray, wherein the active energy ray-curable aqueous ink comprises water and a curable substance, wherein the curable substance comprises a bifunctional polymerizable monomer represented by formula (1):

(1)

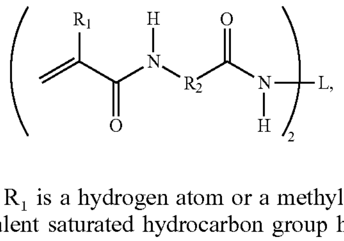

wherein $R_1$ is a hydrogen atom or a methyl group, $R_2$ is a divalent saturated hydrocarbon group having 1 to 5 carbon atoms and L is a divalent saturated hydrocarbon group which may contain an ether bond, an amide bond, a carbonyl bond, a sulfone bond or a sulfonamide bond.

7. The recording method according to claim 6, wherein the step of applying the ink is performed by an ink jet recording system.

8. A recording apparatus, comprising at least:

an ink application device which applies an active energy ray-curable aqueous ink onto a recording medium; and an active energy ray irradiation device which irradiates the active energy ray-curable aqueous ink applied onto the recording medium with an active energy ray, wherein the active energy ray-curable aqueous ink comprises water and a curable substance, wherein the curable substance comprises a bifunctional polymerizable monomer represented by formula (1):

(1)

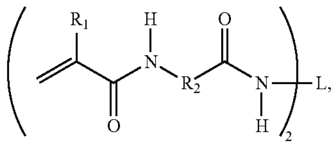

wherein $R_1$ is a hydrogen atom or a methyl group, $R_2$ is a divalent saturated hydrocarbon group having 1 to 5 carbon atoms and L is a divalent saturated hydrocarbon group which may contain an ether bond, an amide bond, a carbonyl bond, a sulfone bond or a sulfonamide bond.

9. The recording apparatus according to claim 8, wherein the ink application device is equipped with a recording head which ejects the ink by an ink jet recording system.

* * * * *